United States Patent [19]
Ghisler

[11] Patent Number: 5,953,657
[45] Date of Patent: Sep. 14, 1999

[54] METHOD AND ARRANGEMENT FOR CALL SETUP IN TELECOMMUNICATIONS NETWORKS USING SIGNALING AIDED REDIALING

[75] Inventor: Walter Ghisler, Upplands Väsby, Switzerland

[73] Assignee: Telefonaktiebolaget LM Ericsson, Stockholm, Sweden

[21] Appl. No.: 08/737,495

[22] Filed: Nov. 19, 1996

[30] Foreign Application Priority Data

May 27, 1994 [CH] Switzerland ............... 9401834

[51] Int. Cl.⁶ .................................................. H04Q 7/20
[52] U.S. Cl. ............................................. 455/417; 455/414
[58] Field of Search ................................. 455/551, 552, 455/553, 422, 432, 435–436, 414, 416, 417; 379/202, 204, 211, 212

[56] References Cited

U.S. PATENT DOCUMENTS

| | | | |
|---|---|---|---|
| 4,734,928 | 3/1988 | Weiner et al. | 455/419 |
| 5,020,091 | 5/1991 | Krolopp et al. | 455/432 |
| 5,222,127 | 6/1993 | Fukui | 379/131 |
| 5,327,486 | 7/1994 | Wolff et al. | 379/96 |
| 5,428,666 | 6/1995 | Fyfe et al. | 379/58 |
| 5,509,062 | 4/1996 | Carlsen et al. | 379/210 |
| 5,515,427 | 5/1996 | Carlsen et al. | 379/201 |
| 5,675,630 | 10/1997 | Beatty | 379/59 |
| 5,793,859 | 8/1998 | Matthews | 455/417 |

FOREIGN PATENT DOCUMENTS

| | | |
|---|---|---|
| 526764 | 2/1993 | European Pat. Off. . |
| 605120 | 7/1994 | European Pat. Off. . |
| 58-3454 | 1/1983 | Japan . |

*Primary Examiner*—Nguyen Vo
*Assistant Examiner*—Edan Orgad
*Attorney, Agent, or Firm*—Burns, Doane, Swecker & Mathis, L.L.P.

[57] ABSTRACT

In a communication system a method and means for signaling-supported-redialing whereby a traffic connection between a calling and a called subscriber is set up by first making a preparatory data-only call in order to get, via machine-readable inband signaling, alternative telephone numbers to terminals available to the called subscriber and after that going on-hook to terminate the preparatory data-only call and going off-hook again to make a new call for the actual traffic, redialing one of the numbers just received from the called subscriber.

20 Claims, 5 Drawing Sheets

METHOD AND ARRANGEMENT FOR CALL SETUP IN TELECOMMUNICATIONS NETWORKS USING SIGNALING AIDED REDIALING

FIELD OF THE INVENTION

The present invention relates to the setting up of calls in and between communication networks. More particularly, the present invention is directed to a method and apparatus for setting up at least one connection in at least one network for communication between a calling and a called subscriber.

BACKGROUND OF THE INVENTION

First some remarks about the used terminology. "Call forwarding" is a feature under control of the called subscriber pB (the person B). Call forwarding means that if the called subscriber pB wants to receive calls over a terminal C different from the usual one he/she instructs the network accordingly and pB pays for the additional cost. As opposed to this, "redialing" means terminating a first call by going on-hook and then going off-hook again and re-performing dialing using a new number for dialing. Redialing is under control of the calling subscriber pA (the person A) and pA profits from any cost saving or pays for any additional cost resulting from the redialing. "Call redirecting" is used in the present text as a common designation for changes in call routing, independently of whether the responsible actor is the calling pA or the called pB subscriber.

It is the aim of modern telecommunication to provide universal mobility, i.e. to make it possible for roaming subscribers to communicate with each other from and to terminals in virtually any networks. A simple type of mobility has been provided for a long time through call forwarding features in wire-bound and mobile radio telecommunication networks, allowing calls to be received on an alternative terminal. More advanced mobility, but restricted to a certain area, has been provided by cellular radio systems, allowing calls to be received over a mobile radio terminal carried by the called subscriber. "Global" mobility has been described in the international published application WO94/05129, allowing in principle calls to be received in any mobile radio network all over the world.

However subscribers want to have even better mobility not only geographically but also between networks and easily select between terminals available e.g. cellular radio terminals, wire-bound terminals, personal computers, etc. for special communication needs and/or to minimise cost.

DESCRIPTION OF RELATED ART

Figure 1:
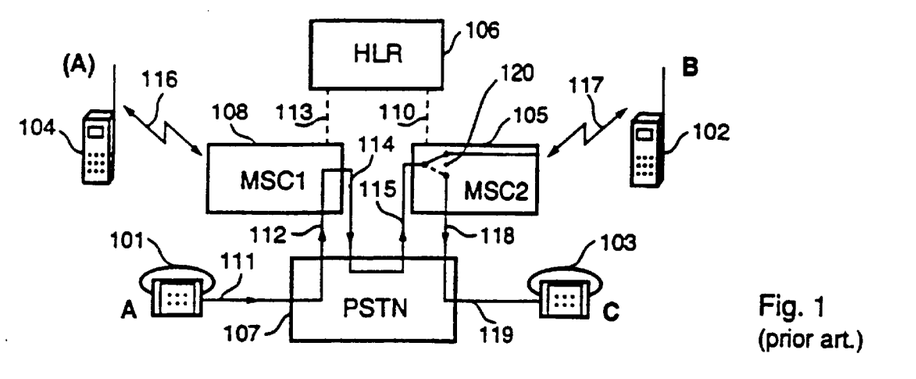
FIG. 1 illustrates prior art forwarding in a mobile services switching centre MSC2 visited by a called subscriber pB having a terminal B.
Figure 2:
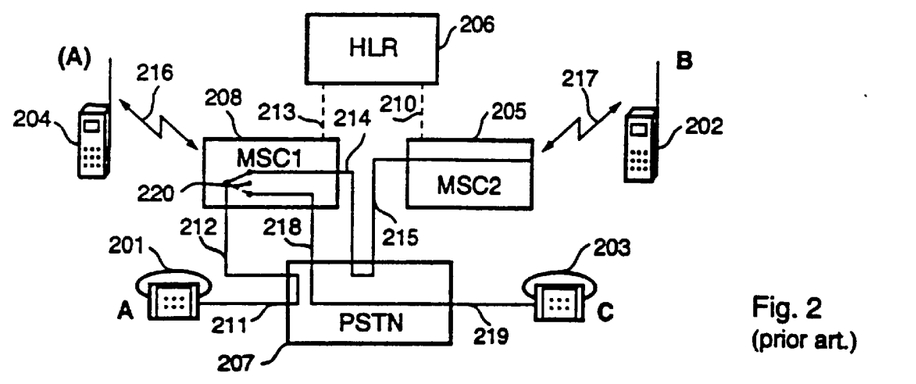
FIG. 2 illustrates prior art forwarding in a mobile services switching centre MSC1 being the gateway MSC of a calling subscriber pA having a terminal A.
Figure 3:
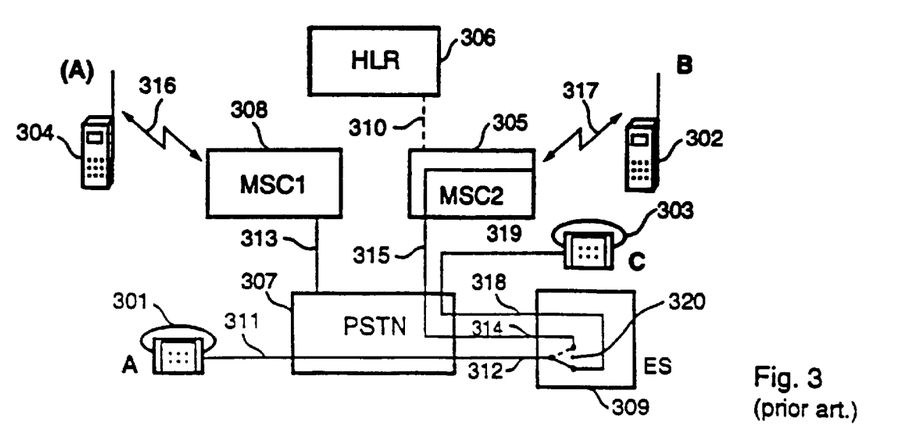
FIG. 3 illustrates prior art forwarding in an electronic secretary ES owned by a called subscriber pB having a terminal B.
Figure 4:
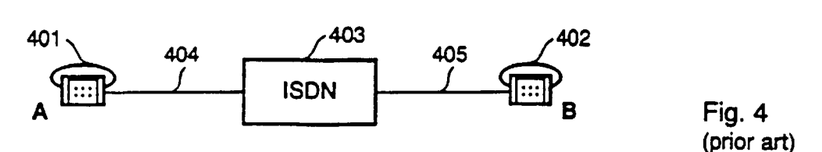
FIG. 4 illustrates prior art No 7 signaling of a called terminal B's telephone number to the calling terminal A.

To alternate between networks it is necessary to be able to redirect incoming calls to wanted terminals. FIGS. 1–3 illustrate some known examples of forwarding incoming calls from a mobile radio terminal to a wire-bound telephone whereas FIG. 4 illustrates a known example of signaling the terminal B number to a terminal A in an Integrated Services Digital Network ISDN.

Call forwarding is defined as redirecting a call at set up of the call under control of the called subscriber pB to a so-called C-terminal rather than receiving the call on the B-terminal specified by the calling subscriber pA through dialing.

In FIG. 1, a wired network PSTN, public switched telephone network 107, is shown together with a cellular radio network consisting of two mobile services switching centres MSC1 108 and MSC2 105 and a home location register HLR 106 connected to MSC1 and MSC2. A calling subscriber pA (not shown) uses a telephone A 101 to dial the telephone number of a called subscriber pB (not shown) having a mobile radio terminal B 102. The connection is via line 111 to the public switched telephone network PSTN 107 and via line 112 to the mobile services switching centre MSC1 108. Alternatively, a mobile radio terminal (A) 104 and a radio channel 116 may be used by the calling subscriber pA instead of the wire-bound terminal 101. MSC1 sends the dialed B-number via signaling connection 113 to the home location register HLR 106 and receives from HLR 106 a roaming number allowing routing to the mobile radio terminal B 102 via the PSTN 107, connections 114, 115, a mobile services switching centre MSC2 105 and a radio channel 117. The mobile radio terminal 102 has earlier registered itself as being in the area of MSC2 105, whereby the signaling connection 110 was used by MSC2 for the registration and for receiving and storing in MSC2 a so-called C-number to which to forward incoming calls when the terminal 102 is busy or does not reply within a specific time. If we now assume that the terminal B is actually busy when the described call arrives to MSC2 105, the call will be redirected to the wire-bound terminal C 103 via PSTN 107 and connections 118, 119, as indicated by the switch 120 in MSC2 105. One disadvantage for the calling subscriber in this situation is that he/she usually pays the higher cellular rate inspite of the fact that the actually used C-terminal 103 is wire-bound.

In FIG. 2 a wired network is shown together with a cellular radio network slightly different from the cellular network of FIG. 1. A calling subscriber pA (not shown) uses a telephone A 201 to dial the telephone number of a called subscriber pB (not shown) having a mobile radio terminal B 202. The connection is via line 211 to the public switched telephone network PSTN 207 and via line 212 to the mobile services switching centre MSC1 208. Alternatively, a mobile radio terminal (A) 204 and a radio channel 216 may be used by the calling subscriber pA instead of the wire-bound terminal 201. MSC1 208 sends the dialed B-number via signaling connection 213 to the home location register HLR 206 and receives from HLR 206 a roaming number allowing routing to the mobile radio terminal B 202 via the PSTN 207, connections 214, 215, a mobile services switching centre MSC2 205 and a radio channel 217. The mobile radio terminal 202 has earlier registered itself as being in the area of MSC2 205, whereby the signaling connection 210 was used by MSC2 for the registration in HLR 206 but no C-number was sent from HLR 206 to MSC2 205. If we now assume that the terminal B is actually busy when the described call arrives to MSC2 205, the status signal "busy" will be signaled back from MSC2 205 over PSTN 207 and the connections 215, 214 to MSC1 208. MSC1 208 requests and receives the C-number from HLR 206 via signaling connection 213 and then MSC1 208 redirects the call to the wire-bound terminal C 203 via PSTN 207 and connections 218, 219, as indicated by the switch 220 in MSC1 208. The difference between the case of FIG. 1 and the case illustrated in FIG. 2 is that in the case of FIG. 2 the C-number is kept stored in HLR 206 and provided to MSC1 on request rather than being transferred to and stored in MSC2 205 during registration of the called mobile radio terminal.

In FIG. 3 a wired network PSTN is shown together with a cellular radio network and an electronic secretary ES 309 which is e.g. a small telecommunication switch. A calling subscriber pA (not shown) uses a telephone A 301 to dial the telephone number of a called subscriber pB (not shown)

having an electronic secretary ES 309. The connection is via line 311 to the public switched telephone network PSTN 307 and via line 312, the electronic secretary ES 309, lines 314, 315 and PSTN 307 to the mobile services switching centre MSC2 305 and via radio connection 317 to the mobile radio terminal B 302 or to the wire-bound terminal C 303. Alternatively, a mobile radioterminal (A) 304 and a radio channel 316 may be used by the calling subscriber pA instead of the wire-bound terminal 301. MSC1 308 does not need to consult HLR 306 because the dialed number is the telephone catalog number of the electronic secretary ES 309 and MSC1 therefore routes the call via connetion 313 to the PSTN 307 and further (not shown) to ES 309. ES 309 knows from earlier registering messages received from its owner that the owner is presently reacheable via his/her mobile radio terminal and therefore routes the connection to terminal B 302 via the connections 314, 315, PSTN 307, MSC2 305 and radio connection 317, whereby it has been assumed that ES 309 and terminal B are both in the area of MSC2 305. The signaling connection 310 has been used earlier by the terminal B 302 for registering in HLR 306 indicating its present location in the area of MSC2 305. The difference to the case illustrated in FIG. 2 is that in the case of FIG. 3 the C-number is kept stored in the ES 309 and not in an HLR and that all calls to terminal B 302 are first routed to the ES 309. If we now assume that the terminal B 302 is actually busy when the described call arrives to MSC2 305, the status signal "$^1$busy" will be signaled back over PSTN 307 and the connections 315, 314 to the ES 309 and in the ES the call will be redirected to the wire-bound terminal C 303 via PSTN 307 and connections 318, 319, as indicated by the switch 320 in ES 309. One disadvantage of using an electronic secretary ES is the fact that ES is associated with the called subscriber and substancial detour routing, in the US called tromboning, may result from the moving about of terminal B 302 since all calls have to go first to ES 309 independently of the location of the calling party A.

FIG. 4 illustrates related art known from an Integrated Services Digital Network ISDN. In particular, reference is made to the "Connected Line Identification Presentation (COLP) supplementary service" incorporated in the "Integrated Services digital network User Part (ISUP) protocol" of the Signaling system No.7, described by the European Telecommunications Standards Institute (ETSI). Said COLP service is a service a user may subscribe to in order to automatically be informed on the telephone number of a called subscriber when originating a call to said called subscriber. When the user makes a call from his/her terminal A 401 via the digital line 404, the ISDN 403 and the digital line 405 to the terminal B 402 the terminal 402 automatically transfers back to the terminal A by digital system No.7 signaling, the telephone number of terminal B 402. This telephone number may be the number of a fax-terminal or similar and the calling party may be interested in checking that the answering terminal actually is the intended one before sending information which may be confidential. One disadvantage of this ISDN feature is the fact that the communicating terminals must be ISDN terminals connected to the ISDN (digital) network.

The limitations and disadvantages of the described related art are discussed further in the following.

Within a cellular network, although in older systems the forwarding point was chosen in the MSC visited by the B-subscriber (MSC2) as shown in FIG. 1, the forwarding point of more modern cellular systems has been located in the gateway MSC, i.e. MSC1 near the A-subscriber as shown in FIG. 2. This latter method reduces the detour routing ("trombone") of the transmission path when forwarding. But this method is limited to the concerned cellular network and does not eliminate the detour routing caused by forwarding calls between different networks as e.g. if a call from the public switched telephone network PSTN in France to a cellular subscriber of the Nordic Mobile Telephone (NMT) mobile radio network in Scandinavia is forwarded in a mobile services switching centre MSC in Scandinavia back to France where the called subscriber is located at the time. Also, the more expensive cellular rates are charged to the calling subscriber when forwarding a call from cellular to wire-bound terminals.

In a network as shown in FIG. 3 serving subscribers with more advanced requirements, the forwarding point has sometimes been located in a B-subscriber owned terminal, such as in the case of the "electronic secretary" described in the inter-national application (PCT/SE93/00078). This gives the called subscribers the possibility of call forwarding between different networks and paying for cellular only when using cellular, but detour routing is still not avoided because the location of the electronic secretary ES is fixed and not at all associated with the calling subscriber and his/her location.

The COLP function shown in FIG. 4 automatically transmits the B-terminal number to the A-terminal and presents it to the user of the A-terminal, thereby enabling said calling user to check if the responding terminal is the intended one. But this feature uses functions such as screening and modifying transferred numbers in the exchanges of the ISDN network and is not generally applicable outside the ISDN network or between networks because of the special digital No.7 signaling.

Further to the related art of call forwarding and terminal B number signaling described in FIGS. 1–4 there is the following known method of redialing (no figure): If a calling subscriber pA dials a called subscriber pB using pB's home telephone number there may be a telephone answering machine informing the calling subscriber pA by a voice message that the user pB is not at home but may be reached over another specified telephone number C. The subscriber pA then may go on-hook and off-hook again, redial using the specified C number and succeed to communicate with the subscriber pB. This method is applicable to all networks but is too time consuming to be used extensively.

Further to the above described related art regarding redirecting it should be mentioned for the understanding of the invention that it is known from U.S. application 07/936,273 to use a barcode reader to read a telephone number of a nearby wire-bound telephone set from a bar code lable and to store this number in a cellular radio terminal. An even simpler alternative method would be desirable.

SUMMARY OF THE INVENTION

A problem with the described related art is that call forwarding in many cases causes detour routing, in the US called tromboning, over a distant forwarding point, rather than routing directly between the calling terminal A and the terminal C to which the call is to be forwarded, FIG. 1–3. This may be associated with unnecessary cost for both the calling and the called subscribers.

Another problem with the described related art is that providing voice information from a telephone answering device to a caller and manual redialing by the caller as described above is awkward and slow because depending on spoken messages, although it does eliminate tromboning.

Another problem is that the digital data signaling of FIG. 4 is limited to the ISDN network and not generally applicable over different networks.

Another problem is that information regarding called subscribers is usually stored in a home location register HLR or in a telephone answering device which are at fixed locations and it would be very time consuming to continuously update these stores on what terminals are currently available to a subscriber who is moving around.

Another problem with the described related art is that storing the addresses of the alternative terminals C in the called subscriber's mobile radio terminal B is still too time consuming to encourage subscribers to use these methods as e.g. described in U.S. application 07/936,273 mentioned hereinabove. In particular, a subscriber carrying a cellular mobile radio terminal would prefer, at least when arriving at work or at home to have a simple way for storing or activating a prestored address of his/her nearby wire-bound terminal in his/her handheld.

Another problem with the described related art is that call forwarding is under the exclusive control of the called subscriber while redialing is under the exclusive control of the calling subscriber.

It is an object of the present invention to make it possible for users of communication networks to eliminate tromboning comprising one or several paths in telecommunication networks if calling and called subscriber agree to such elimination.

It is a further object of the present invention to make it possible for users of telecommunication networks to select the most cost-effective network or networks and terminals available at the time.

It is a further object of the invention to store and make use of information about alternative terminals available to a called subscriber with a minimum of actions by that subscriber.

The present invention solves these problems by allowing both the called subscriber pB, i.e. the person pB and the calling subscriber pA, i.e. the person pA to participate in the redirecting of calls, i.e. to participate in the selecting of the terminal to be used by the called subscriber pB and in selecting the routing of a traffic connection between the calling subscriber pA and the called subscriber pB. According to the present invention a method and apparatus is provided where firstly, a redirecting point is provided which is under control of the calling subscriber pA, i.e. in the terminal A itself, or in an accessory for the terminal A, or in a service node near pA, e.g. a PABX under the control of terminal A; and where secondly possible forwarding addresses, so called terminal C addresses, are received in said redirecting point during a very short preparatory call which preceeds the actual traffic call; and thirdly, said terminal C addresses are analysed in said redirecting point and if indicated from the subscriber pA's point of view e.g. available as prestored instructions from pA, redialing is performed from said redirecting point using one of said terminal C addresses. The analysing and redialing may be fully automatic or involve human participation from the calling subscriber pA. The signaling used with this procedure is preferably performed via in-band signaling, e.g. dual tone multi frequency DTMF or frequency shift keying modulation FSKM, whereby at least one terminal C number is transmitted over at least one network to the redirecting point. Redialing is performed if indicated by analysing said at least one terminal C number and the originally dialed number, either using a predetermined algorithm, or using human controlled selection in real time by the calling subscriber pA, of a terminal C number received and shown on a display of the terminal A. The subscriber pB participates in the process by providing the terminal C address (es) acceptable to him/her and sending them preferably in-band to the redirecting point which redirecting point is under control of the calling subscriber pA.

According to another aspect of the present invention the problem of providing the telephone number of a subscriber's wire-bound telephone at home or at work when the called subscriber is at home or at work respectively, is solved by connecting an accessory to the line of the wire-bound telephones enabling registering of the telephone number of the associated wire-bound telephone in the handheld radio mobile terminal while also charging the battery of the handheld. Storing is performed when the handheld is inserted into said charging accessory, either by the accessory making a call to a service providing the telephone number of the wire-bound telephone associated with the accessory, or by simply reading said telephone number if it has been manually prestored in the accessory. When the handheld is removed from the charger, the stored telephone number is deleted from the store of the handheld. Thus, the handheld will provide the telephone number of the temporarily associated wire-bound terminal to redirecting points capable of what may be called signaling supported redialing, but only as long as the handheld of the called subscriber pB is placed in the accessory.

According to another aspect of the present invention it also provides a method and apparatus for signaling supported redialing, i.e. for call setup from a calling subscriber pA to a called subscriber pB whereby two connections are normally set up, a first preparatory connection in order to data-signal to the redirecting point in the terminal A itself, or in an accessory for the terminal A, or in a service node under the control of terminal A, information on the called subscriber pB's parameters, in particular his/her alternative terminal C addresses including sometimes the terminal B number itself, and a second connection for the actual user traffic between the subscribers pA and pB. A novel mobile or wire-bound terminal A or a service node SN under control of the calling subscriber pA is used to call a novel terminal B, preferably of the mobile radio type, whereafter said called subscriber pB's parameters are signaled from the terminal B to the terminal A, passing transparently through the network (s), normally as in-band DTMF or FSKM signaling although digital coding may be used e.g. over some cellular radio air-interfaces. Note however, that redialing is not always indicated. The preparatory call mentioned above may be kept connected and used for traffic e.g. if the called subscriber has no alternatives to his/her radio terminal or if the call is direct or forwarded only via some negligeable detour routing making no difference to the cost.

According to a further aspect of the invention it provides also a method and apparatus for making said first preparatory connection from said novel originating terminal A to said novel terminal B via a service node SN, whereas said second connection for the actual user traffic between the subscribers pA and pB is set up directly, bypassing said service node SN.

According to a further aspect of the invention it provides also a method and apparatus for making said first preparatory connection from a known type of originating terminal A to a novel terminal B via a service node SN under control of the calling subscriber pA, whereby said first and second connections both are set up via said service node.

According to a further aspect of the present invention it provides a charger accessory for a mobile radio terminal performing also the function to identify the telephone line to which it is connected together with a wire-bound telephone set, when identifying is requested by a handheld being inserted into the charger. The charger accessory performs this function by calling a service which retrieves the calling line number, i.e. the so-called A-number, according to well known procedures and transmits it back in-band to the calling charger accessory.

A first merit of the present invention is to provide person to person communication over any terminals in all networks whereby the person is identified by the telephone number of one of his/her terminals, preferably his/her handheld.

A further merit is to minimise communication cost when interworking between cellular and business systems. According to the invention a called business subscriber across the corridor may be called on his/her handheld and redialed automatically to his/her temporary desk-top terminal. Supplementing cellular-to-wire-bound redirecting of calls by automatic redialing according to the present invention enables person to person telephony at the lower wire-bound cost.

A further merit is to enable cost saving for all communication. The handheld, apart from being a terminal for relatively expensive communication when the owner drives a car etc. is also a portable private home location register HLRP informing on lower cost communication alternatives when available and on other called subscriber parameters such as e.g. time when he/she can be reached.

A further merit of the invention is the possibility to provide the inventive feature without new procedures. This is achieved by combining battery charging of a handheld which is already practiced and remembered by subscribers, with the inventive registering of nearby wire-bound terminals in a handheld which would easily be forgotten if separate.

A further merit of the invention is the possibility to provide the inventive feature for wire-bound terminals used to originate a call without changes to the existing terminals. This is the case if the inventive means required on the calling side are implemented in accessories to the terminals or in exchanges (e.g. PABXs) to which the terminals are connected.

DETAILED DESCRIPTION OF THE PREFERRED EMBODIMENTS

Figure 5:
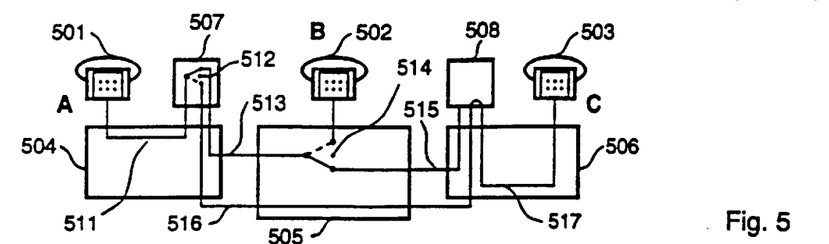
FIG. 5 illustrates a communication system including an embodiment of the present invention.

FIG. 5 shows a diagram of a communication system including wired subscriber terminals only and in which the method according to the invention is used. A calling subscriber pA (not shown) has a wire-bound terminal A 501 connected to a private automatic branch exchange PABX 504. Such an exchange is well known in the art and serves a limited number of subscribers in a limited area. It has a number of subscriber lines connected to it and performs switching and multiplexing of these subscriber lines to any among several trunk lines 513. One example of such an exchange is the MD110 marketed by Ericsson (see Ericsson system description ASB 50104, document number 1551-ASB 50104 Uen). The exchange 504 is connected to the public switched telephone network (PSTN) 505 via the trunk line 513. A PSTN is generally a network which includes group selectors, trunk lines and other blocks and circuits such as exchange terminal circuits, interface circuits, signaling systems, control systems for programs and program routines etc. in order to communicate and to direct incoming calls and signaling information to intended destinations such as other PABXs. A PSTN can include the telecommunication system of one or several countries and the transmission means between the telephone systems of several countries. Thus, the outgoing lines from the PSTN 505 can be trunk lines connected to group selectors or PABXs in another country than the country where the PABX 504 is located. In FIG. 5, one such PABX designated 506 is connected to the PSTN 505. The called subscriber pB (not shown) is assumed to have a wire-bound telephone set 502 connected to the PSTN 505 via a local exchange (not shown) in order to communicate to other subscribers in a known manner. Subscriber pB is furthermore assumed to have left his ordinary terminal 502 and to have roamed to the location of terminal C 503. This terminal C is connected to the PABX 506 which in turn is connected to the PSTN 505 via a trunk line 515 in the same manner as mentioned above regarding PABX 504. The subscriber pB has requested and obtained by the usual well known procedure that all calls incoming to his/her terminal 502 be forwarded to terminal C 503. In FIG. 5 there are furthermore two service nodes 507 and 508 which are associated and connected to the PABXs 504 and 506 respectively. The service nodes 507 and 508 may be described as small PABXs e.g. of the same MD110 type as mentioned above and they perform functions related to the present invention which will be described below. It is possible to integrate these functions in the respective PABXs 504 and 506. But the invention is better understood assuming they are separate. In the following an example of setting up of a call from calling subscriber pA to called subscriber pB will be described.

Figure 10:
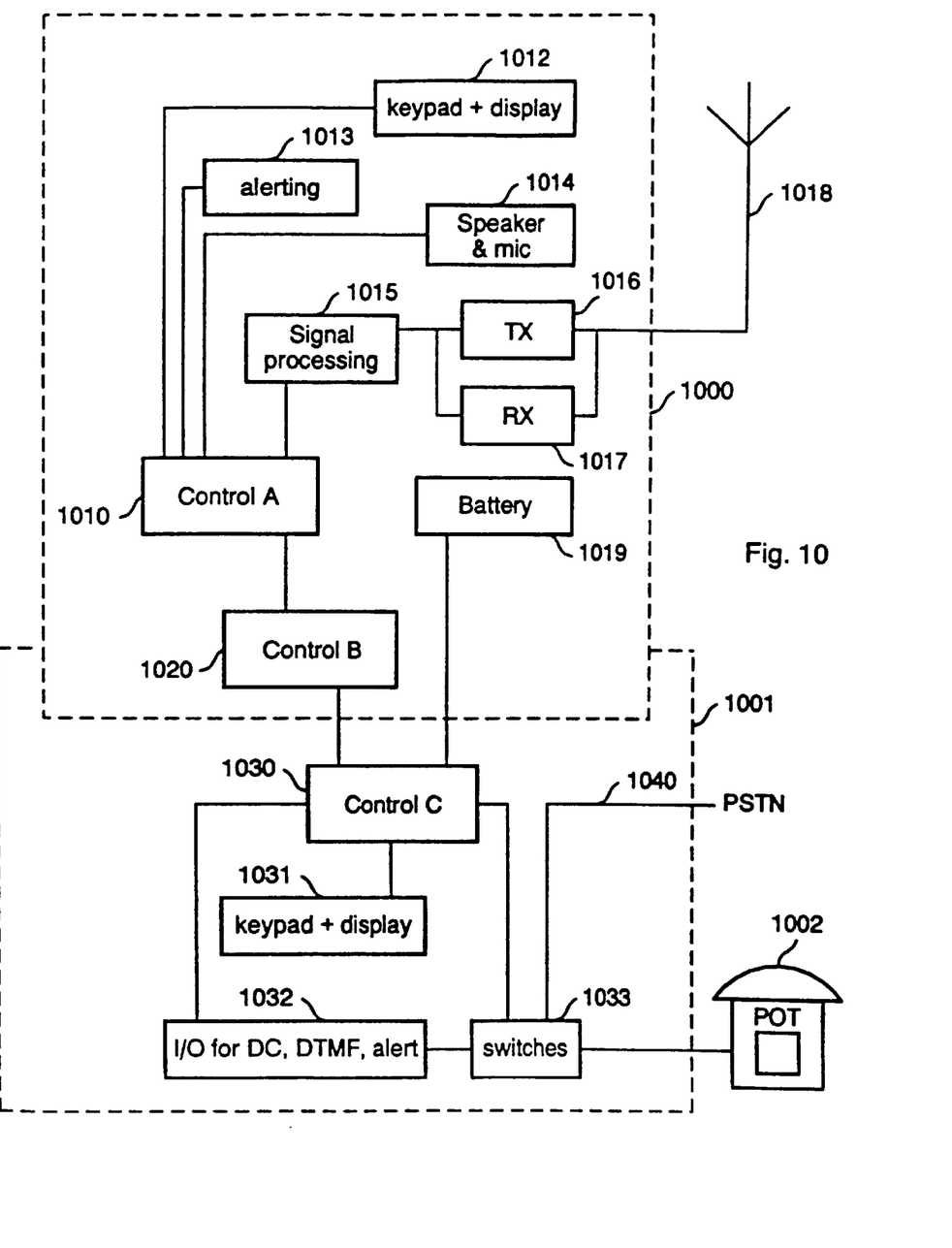
FIG. 10 shows a blockdiagram of a handheld and battery charger accessory according to the invention.

A calling subscriber pA in Stockholm intends to call a Frenchman having a wire-bound terminal 502 connected to the Public Switched Telephone Network PSTN 505 in Paris. However, the Frenchman has roamed to Oslo and has forwarded in the traditional way his incoming calls to the PABX 506 and conventional wire-bound terminal 503 in Oslo which is symbolised by the switch 514. A service node 507 is connected to the PABX 504 and performs the inventive redialing when indicated. A service node 508 is connected to the PABX 506 and answers all incoming calls automatically. The terminal B 502 is connected directly to the PSTN. Subscriber pA goes off-hook with his terminal A 501 and dials the French international number of terminal B 502 known to him and is connected via connection 511 to the service node (SN) 507 connected to the PABX 504. The connection 511 between the terminal A 501 and the SN 507 may be set up automatically when terminal A 501 goes offhook or it may be selected by dialing a predefined prefix e.g. 0031, to the said number of terminal B 502. The SN 507 establishes a preparatory call, enabling redialing if required, between SN 507 and SN 508 via connections 513, 515, and the switch 514 symbolising the forwarding in the PSTN 505 in Paris using the telephone number of terminal C 503 which has been stored in the PSTN by the roaming Frenchman according to known art. SN 507 signals a dual tone multi frequency DTMF code, e.g. "#1" continuously to SN 508 until SN 508 signals off-hook on behalf of terminal C back to PSTN and until SN 508 has received this DTMF code #. SN 508 goes automatically and unconditionally off-hook and sends in DTMF form to SN 507 via Paris, i.e. connections 515, 513 and "switches" 514 and 512, the terminal C 503 telephone number and any other data of interest such as e.g. a Nordic Mobile Telephone NXT number of a not shown alternative mobile radio terminal that may be dialed in case of no answer from terminal C 503. SN 507 stores these C numbers and analyses them together with the B number of terminal 502 and the A number of terminal A 501 which are available to SN 507. An algorithm in SN 507 indicates that redialing by subscriber pA is advantageous from a cost point of view since the connection Stockholm to Oslo is much shorter than the connection via Paris. Therefore SN 507 goes on-hook to terminate the preparatory call and off-hook to set up the actual traffic call, whereby SN 507 dials the terminal C 503 number received from Oslo, thus short-cutting the detour or trombone via Paris of the preparatory call. If instead the Frenchman had roamed to Madrid redialing would not be of interest to the calling subscriber pA because then pA would pay for the whole connection from Stockholm to Madrid instead of from Stockholm to Paris only since the roamer usually pays for the forwarded part of a connection. The action of teriminating the preparatory call and establishing a traffic call via connections 516 through PSTN 505 is symbolised by the switch 512. Also said traffic call is received first by SN 508, but without the DTMF code "#" on the line, and SN 508 connects the call via connection 517 and PABX 506 to terminal C 503 after a short time-out of about 1 second making sure no DTMF code "#" will be sent, which would indicate a preparatory call. It can be seen that the service nodes SN 507 and SN 508 have different roles to play in the described call, SN 507 being the originating SN and SN 508 being the terminating SN. Of course, if the function is introduced, each PABX will be equipped with both types (originating-terminating) of SN. Further, it should be understood that the SN types have been described as separate terminal functions in a PABX. But it is possible and even desirable to integrate these functions in the PABXs which is easily understood by those of normal skill in the art. Another variety of the invention is to integrate the service nodes in the respective terminals or to provide them as desk-top accessories to existing telephones. Alternatively, terminal C 503 can be a mobile radio terminal and be physically integrated with the SN 508 such that both the preparatory call and the traffic call are answered in the same terminal C. In this latter case, service node 508 is portable and radio connected to the PABX 506. The preparatory call includes a detour via Paris and the traffic call is routed directly from Stockholm to Oslo via connections 516 and 517. Note that although in the particular case of FIG. 5 the signaling between PABXs 507 and 508 could follow some known standard inter-exchange signaling this is not desirable. Instead, according to the invention, in-band signaling e.g. Dual Tone Multi Frequency DTMF, is used in order to provide signaling means compatible with both the case when the called number is an address of a service node SN and the case when it addresses a terminal, since terminals cannot use interexchange signaling. When integrating the inventive functions with the terminals or making accessories for single terminals the previously mentioned PABX MD110 cannot be used because it is too big. Refer to FIG. 10 where blocks HLC and HLRP are shown as included in the block Control B. The functions are the same as in the service nodes but limited to just one subscriber, whereas the not integrated SNs 507 and 508 of FIG. 5 serve many subscribers.

Figure 6:
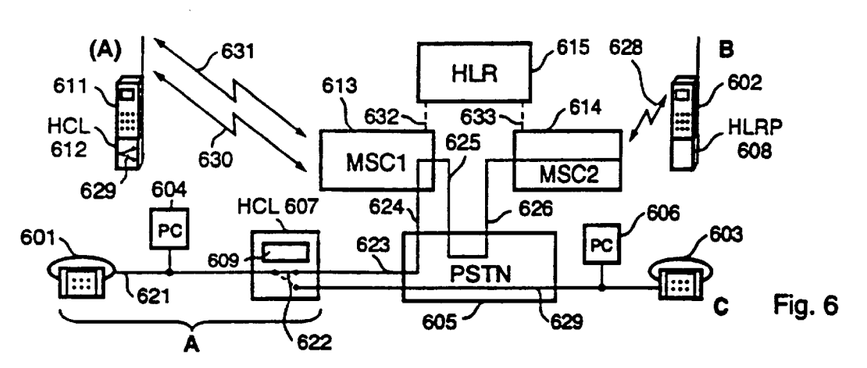
FIG. 6 illustrates an embodiment of the present invention in a cellular mobile network connected to a wire-bound network.

FIG. 6 illustrates an embodiment of the present invention in a cellular mobile radio network consisting of mobile services switching centres MSC1 613, MSC2 614, home location register HLR 615 and two mobile radio terminals 611, 602. This network is connected to a wire-bound network PSTN having two terminals A 601 and C 603 with accessories 604, 607 and 606. A calling not shown subscriber pA has a terminal A consisting of a plain old telephone POT 601, a personal computer PC 604 and a human control module HCL 607. The calling subscriber pA uses the telephone 601 to dial the telephone number of a called subscriber pB having the mobile radio terminal B 602. The connection is via line 621, 623 to the public switched telephone network PSTN 605 and via line 624 to the mobile services switching centre MSC1 613. Alternatively, a mobile radio terminal (A) 611 and a radio channel 630 may be used by the calling subscriber pA instead of the wire-bound terminal 601. MSC1 613 sends the dialed B-number via signaling connection 632 to the home location register HLR 615 and receives from HLR 615 a roaming number allowing routing to the mobile radio terminal B 602 via the PSTN 605, connections 625, 626, a mobile services switching centre MSC2 614 and a radio connection 628. The mobile radio terminal 602 has earlier registered itself as being in the area of MSC2 614, whereby the signaling connection 633 was used by MSC2 for the registration. The difference to the case illustrated in FIG. 2 is that in the case of FIG. 6 the C-number is kept stored in the inventive personal home location register HLRP 608 of the terminal B rather than in any part of the networks. If we now assume that the called subscriber pB has further to his/her handheld terminal B a wire-bound terminal C 603 on a desk nearby and that the telephone number of terminal C 603 is stored in the HLRP 608 of terminal 602 when the described preparatory call arrives to MSC2 614, said telephone number of terminal C 603 is signaled back over PSTN 605 and the connections 626, 625 to MSC1 613 and the PSTN 605 and connections 624, 623 to the human control module HCL 607 from where the call may be redirected to the wire-bound terminal C 603 via PSTN 605 and connections 629 as indicated by the switch 622 in HCL 607 whereby HCL 607 may perform fully automatically under the control of a preprogramed algorithm or semi-automatically involving the selection via the keyset of terminal A 601 of one of several alternative terminal C numbers presented on a display 609 of HCL 607. The mobile terminal 611 has a human control module 612 which performs a redialing of the terminal 611 over a second radio channel 631 by means of a new access as symbolized by the switch 629. If the mobile terminal 611 is used as a calling terminal (A), HCL 612 may redial over the second radio channel 631 as mentioned.

A reason to choose terminal C rather than terminal B may be the lower cost of wire-bound calls. An alternative reason may arise if the calling subscriber pA has a personal computer 604 connected to his/her line and the called subscriber pB has a corresponding personal computer 606 connected to a wire-bound terminal C. The signaling aided redialing may occur at the very beginning of the call or during the traffic call when the communicating parties decide they want PC communication. Then a predetermined procedure may be used to in-band signal the terminal C number to the terminal A followed by redialing as described earlier.

Figure 7:
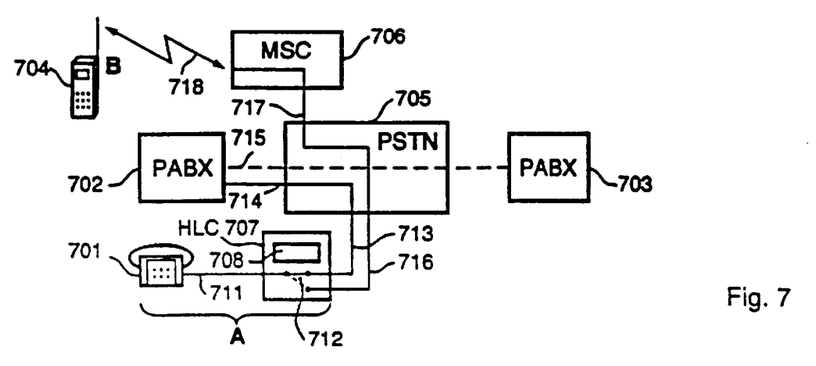
FIG. 7 illustrates an embodiment of the present invention in networks supported by special service terminals.

FIG. 7 illustrates an embodiment of the present invention in networks supported by special service terminals as described in the above mentioned international application W094/051291 hereby included by reference in the present application. It can be understood from this embodiment that the information on alternative terminals C may be signaled from a service node supporting the called subscriber pB, rather than from a terminal B of the called subscriber pB. A calling subscriber pA wanting to communicate with a called subscriber pB uses a wire-bound terminal A 701 to call the cellular mobile terminal B 704 via a network of intelligent terminals 702, 703 e.g. private branch exchanges MD110 named hereinabove, using, when dialing, a prefix or special number preceding the cellular number. Via connections 711, 713, 714 and PSTN 705 a call is set up to the intelligent node PABX 702 which analyses the dialed number and finds that the called subscriber pB's home node is PABX 703. PABX 702 requests and receives via a digital signaling connection 715 information about the present location of the called subscriber pB having terminal B 704 and signals by in-band signaling this information via connections 714, 713 and PSTN 705 to human control module HLC 707 of terminal A 701. It is understood by those of ordinary skill in the art that the in-band signaling refers to transmission over connections 714, 713 and through the PSTN whereas signaling from PSTN to the terminal A may alternatively involve digital coding over the air-interface in the case of terminal A being a digital cellular mobile terminal such as a digital EIA/TIA IS-54 terminal. Again, as explained hereinabove for FIG. 6, redialing may be performed in the HLC 707 of terminal A when the information about the location of the called subscriber has been received from PABX 702 and analysed, either redialing fully automatically using a predefined algorithm or including a selection step whereby the subscriber pA selects from alternatives shown on display 708 using the keys of the POT 701. This redialing which is symbolised by the switch 712 results in a connection between POT 701 and handheld B 704 via connections 711, 716, 717, radio connection 718, the PSTN 705 and MSC 706.

Figure 8:
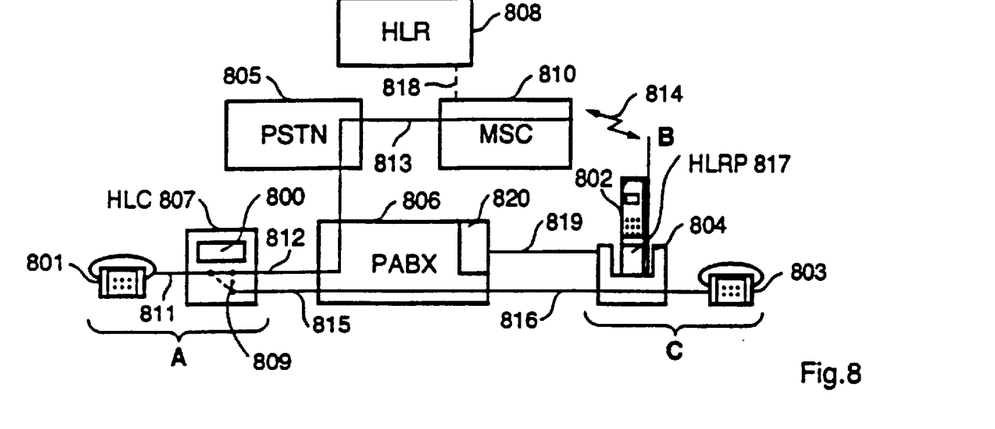
FIG. 8 illustrates an embodiment of the present invention where a handheld is placed in a special battery charger.

FIG. 8 illustrates an embodiment of the present invention where two subscribers pA and pB have terminals A and B plus C respectively. They work for the same firm in the same location and are both connected to the same PABX. The subscriber pB has just entered his room and placed his handheld in a special battery charger 804. The battery charging function is accomplished either by using the −48 Volts provided by the PSTN on a telephone line or by connecting the charger to the mains whereby both methods are easily understood by those of ordinary skill in the art. Further to said battery charging function, the battery charger 804 informs the inserted handheld according to the present invention of the telephone number of plain old telephone POT 803 connected to the same line as the charger. One way of this informing is as follows: When a handheld B 802 including a personal home location register HLRP 817 is inserted into the battery charger 804 a contact is made by a not shown connector connecting the handheld 802 and the battery charger 804 whereby a call is initiated via connection 819 to a special service device 820 connected to or inside the PABX 806. The device 820 requests the telephone number of the line 819 from which the call is made and receives according to well known procedures the A-number of this line. The device 820 then returns this A-number via the calling line to the terminal 804 which in turn transfers this information via said connector to the handheld 802 storing this A-number in HLRP 817 as long as handheld 802 stays inserted in the battery charger 804. Alternatively, if no such service 820 is available with the PABX 806 the identity of the line to which the battery charger is connected may be entered manually into the battery charger 804 at installation of said battery charger via e.g. the keyset of the associated POT 803 using a predetermined procedure. This may even be preferable because then nothing new is required in the networks.

If now a calling subscriber pA from his POT 801 with accessory HLC 807 dials the handheld of subscriber pB a call is set up via connections 811, 812, 813, radio connection 814, the PABX 806, the PSTN 805 and the MSc 810 to the handheld 802. The handheld has registered itself earlier as being in the area of MSC 810 whereby the registration was recorded in HLR 808 via connection 818. The HLC 807 of terminal A receives now from HLRP 817 the telephone number of terminal C 803 and any other terminal C telephone numbers and information as explained hereinabove, via the air interface 814, connections 813, 812, 811 and MSC 810, PSTh 805, PABX 806. HLC 807 then analyses the received data and may perform redialing as indicated by the switch 809 either fully automatically using predefined criteria or including a selection step implying that the calling subscriber pA selects via the keys of POT 801 an alternative shown on the display 800. The redialed call is set up via connections 815, 816 to POT 803 via PABX 806. For those of ordinary skill in the art it is obvious that the accessories HLRP 817 and HLC 807 may be combined into one single equipment allowing the created terminal to perform both originating and terminating calls according to the present invention.

The present invention provides a personal home location register in the handheld itself. However, if the handheld is switched off, a problem arises because the called subscriber pB cannot be reached and also information of alternative ways to reach him/her is unavailable. Therefore it is recommendable to use call forwarding at no answer to a wire-bound terminal, such as a telephone answering device, able to give default information when on-line information is not available.

The storing of terminal C numbers in the handheld using a special battery charger 804 is only an example of how this storing function may be performed. Other methods are possible as e.g. explained in U.S. application 08/019.689 where a barcode reader in the handheld is used to read a telephone number available as a barcode label on a POT. This application is hereby included by reference.

Figure 9:
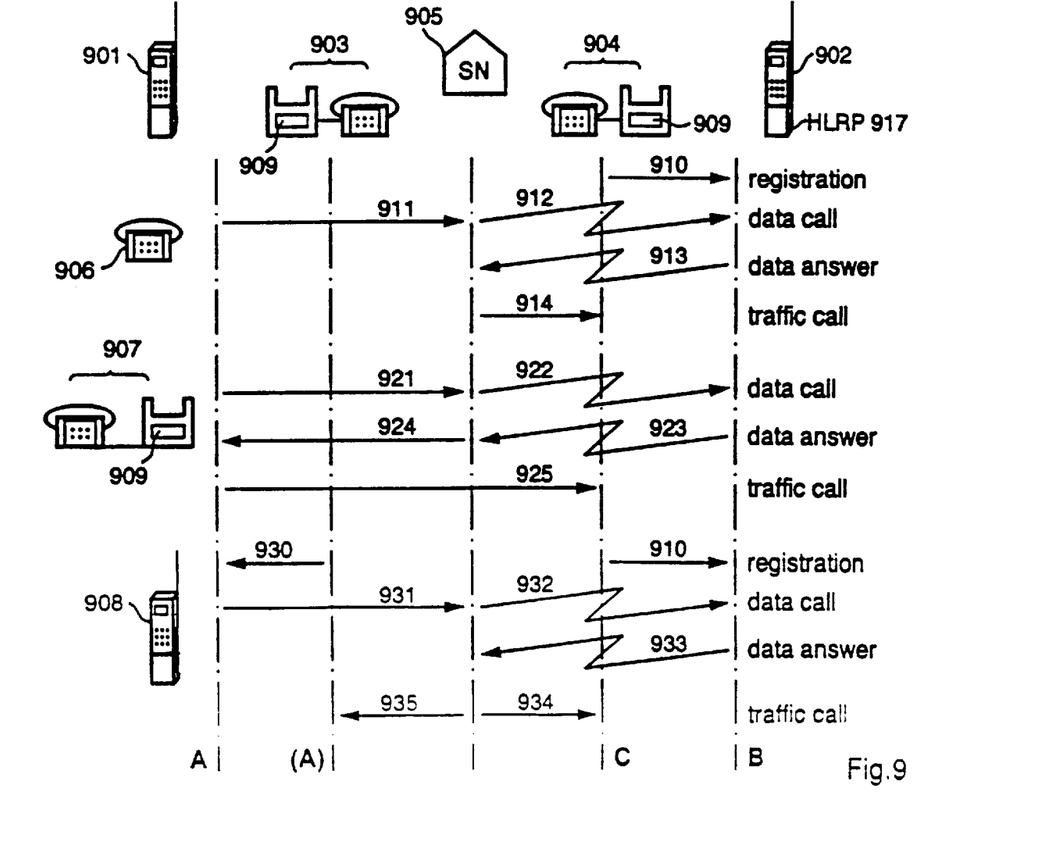
FIG. 9 shows embodiments of the invention with special emphasis on cases using a service node.

FIG. 9 shows three further embodiments of the invention, the first one where the called subscriber uses an inventive battery charger, the second one where the calling subscriber uses an inventive battery charger providing an independent redialing point further to the service node 905 and the third one combining the U.S. patent application 08/019,689 with the present invention. In FIG. 9 only the terminals and redialing points are shown in order not to overload the description because in FIGS. 5 and 6 the participation in the inventive embodiments by the PSTN 505, 605, MSCs 613, 614, HLR 615 and PABXs 504, 506 has been explained in detail. Where a battery charger is shown in FIG. 9 it has been assumed to be of the model associated not only with terminating but also with originating calls as discussed in connection with FIG. 8 and as may be seen from the fact that a display 909 is part of the battery charger allowing the calling subscriber to select a displayed telephone number for redialing. The top of FIG. 9 shows the simplified block diagram including an originating handheld terminal A 901, a nearby wire-bound terminal A 903 with battery charger 909, a service node SN 905 similar to SN 507, a terminating handheld terminal B 902 and a nearby wire-bound terminal-C 904 with battery charger 909.

In a first embodiment of FIG. 9 the terminal 901 is replaced by a plain old telephone POT 906 calling a handheld 902 via the service node 905, which may imply using a special prefix like e.g. 0031 infront of the telephone number of terminal 902 when performing dialing on terminal 906. A connection 911 is set up, the call is parked in SN 905, SN 905 calls terminal 902 via connection 912 and indicates the preparatory call nature by sending the DTMF signal # on the line towards terminal 902. The terminal 902 goes immediately and unconditionally off-hook, senses the signal # on the line, gives the data answer 913 by sending in DTMF form the terminal C number earlier registered in its personal home location register HLRP 917 when inserted in the battery charger 909 of nearby terminal C 904 as symbolised by connection 910, after which SN 905 sets up a connection 914 to wire-bound terminal 904 eliminating any detour routing that may have occured in connections 912 and 913 as represented by the associated zig-zag lines. Note that in this embodiment the calling terminal A is a POT rather than a terminal of the inventive type 903 and that the redialing, eliminating detour routing is performed in the service node SN 905.

In a second embodiment of FIG. 9 the service node SN 905 is used only for the preparatory call connections 921–924, whereas the traffic call connection 925 goes directly from the calling terminal A 907 to the called terminal B 904, bypassing the SN. The preparatory call (921–924) is the same as described earlier (911–913) but further including connection 924 from SN 905 to terminal A 907. Also in this embodiment it has been assumed that registration 910 preceded the call from terminal A 907 to terminal B 902, C 904. Note that redialing in this embodiment is performed in terminal A 907 and that service node SN 905 only handles the preparatory call.

In a third embodiment of FIG. 9 the service node SN 905 is used for all steps in setting up a traffic call via connections 934, 935 between the wire-bound terminal A 903 and the wire-bound terminal B 904 whereby the handheld terminal A 908 and the handheld terminal B 902 are used only with the preparatory call connection 931–933. Again, it has been assumed that registrations via connections 930 and 910 have occured before setting up the described call. This traffic case has earlier been described in U.S. application 08/019,689 except for eliminating detour routing connections 932, 933 by a direct connection 934.

An advantage of having a service node SN 905 according to FIG. 9 consists firstly, in providing elimination of detour routing even if the A-subscriber is a POT without a redialing accessory and secondly, that any adaptation of different signaling systems is performed in the SN. SN is preferably located near the A-subscriber in order to avoid introducing new SN-related detours. The service Node SN 905 is a switch with a processor, e.g. may be a PABX connected to the public network as described earlier. But a SN 905 may alternatively be an integrated part of any network, e.g. the PSTN.

FIG. 10 shows a blockdiagram of a handheld mobile radio station 1000 and battery charger accessory 1001 according to the invention. The handheld 1000 is e.g. according to a cellular standard such as the Global System for Mobile communications GSM and has associated with it the inventive supplementary control B 1020. The plain old telephone POT 1002 is of the type having a keypad and has associated with it an inventive battery charger 1001. According to the invention, control B 1020 is provied in the handheld station 1000 and control C is provided in the battery charger 1001. Each control B, C contains the logic, memory and interfaces associated with the earlier described personal home location register HLRP and human control module HLC, i.e. the blocks performing the inventive signaling supported redialing on the terminating and originating sides of a call respectively. Registering the telephone number of the POT 1002 in the handheld 1000 is performed as follows. The subscriber pB has e.g. come home and has inserted his/her handheld 1000 into the battery charger 1001 whereby connection is made between control B 1020 and control C 1030 on the one hand and between control C 1030 and the battery 1019 on the other hand. Further to starting the charging of the battery this action triggers control C 1030 to call a prestored service number in the PSTN and ask for identification of the telephone line 1040 whereby blocks 1032, 1033 are used in a way familiar to those of normal skill in the art. Said PSTN service identifies the telephone line 1040 using known A-number transmission methods and sends the identified A-number back to the control C 1030 via the line 1040 itself. Control C 1030 then transmits this A-number to control B 1020 where it is stored for later use as a C-number, i.e. as an alternative terminal address to be sent to a subscriber pA calling the handheld terminal 1000. When the subscriber pB leaves home again taking the handheld out of the battery charger 1001 this triggers the control B to erase the stored C number from its memory. The mentioned signaling between the battery charger 1001 and a PSTN service may be performed by a predetermined in-band signaling procedure easily designed by those of normal skill in the art.

Receiving a call when the handheld 1000 is standing in the battery charger 1001 is as follows. Subscriber pA calls from his/her inventive terminal A (not shown) the terminal B 1000 sending DTMF signal # in order to indicate to terminal B that a data answer is requested. Terminal B 1000 goes unconditionally and automatically off-hook, recognises the DTMF signal # and answers sending as DTMF digits the complete terminal C number including area code and national prefix from its memory together with any other information in DTMF form and/or as a voice message such as described in conjunction with FIG. 11. The terminal B 1000 will then be disconnected due to the terminal A (not shown) going on-hook. Terminal A redials using the terminal C number received and an incoming call on line 1040 will be detected by control C 1030 via the switches 1033 and I/O block 1032. It is possible for said terminal A to repeat the procedure starting with DTMF signal # which will cause control C 1030 to provide any further information as e.g. the availability of a nearby personal computer PC (not shown) on another specified telephone line. The terminal A will then give an alerting order in DTMF form to control C 1030 which will cause alerting in block 1032 and subscriber pB will go off-hook with POT 1002 establishing a traffic connection via line 1040 and the switches 1033 to POT 1002. In the case the terminal A is not equipped for signaling aided redialing or does not want to DTMF signal #, the handheld 1000 will, after time-out of about 1 second, via control B 1020 order alerting in block 1013 via control A 1010 and then subscriber pB will go off-hook with handheld 1000 establishing a traffic connection via antenna 1018, transmitter TX 1016, receiver RX 1017, signal processing block 1015, control A 1010 and speaker & microphone 1014. Note that in FIG. 10 it has been assumed that the handheld 1000 is of the GSM type and therefore, DTMF is received and sent over the air-interface as digital codes but translated to/from analog DTMF in the land system.

Originating a call will be discussed for the case the handheld 1000 is not in the battery charger 1001. An originating call will be made from the wire-bound terminal 1002 if possible because of lower cost. However the procedure is the same for the handheld 1000 or the POT 1002 with accessory 1001. Both have keypad and display 1012, 1031, controls 1010, 1030, alerting means 1013, 1032 and speaker & microphone 1014, 1002 (POT). There is a difference in that the connection to the air-interface uses antenna 1018, transmitter TX 1016, receiver RX 1017, signal processing 1015, whereas the connection to the PSTN line 1040 uses switches 1033 and I/O for DC and DTMF 1032. The air-interface of the GSM system uses digital signaling but on the land system side of the air-interface conversion of digital signaling to/from DTMF takes place and DTMF inband signaling is used over the PSTN. Therefore, DTMF or other inband signaling such as FSKM is the signaling means used at least in one land system network of the embodiments and in some cases also over the air-interface, e.g. when the handheld is an analog cellular mobile radio terminal such as an Advanced Mobile Phone Service (AMPS) terminal. When making an originating call from the wire-bound or the radio terminal of FIG. 10 the subscriber pA enters the digits of the terminal B of the called subscriber pB on the keypad of 1012 or 1031 e.g. followed or preceeded by the key # to indicate that he/she wishes to use the inventive signaling supported redialing facility. Control A respectively control B sets up a preparatory call to terminal B (not shown) sending DTMF signal # on the line until an answer comes from the terminal B or, if terminal B is not equiped for signaling aided redialing, after a time out of about 1 second has elapsed after terminal B has gone off-hook which may be sensed in the A-terminal in several ways known to those of ordinary skill in the art. If terminal A receives redialing information, it is shown on the display and analysed using predefined criteria or on-line decision by the calling subscriber pA as explained in more detail using FIG. 11. Then, if indicated, redialing of a terminal C will take place after going on-hook/off-hook in terminal A, otherwise a DTMF order is sent from terminal A to terminal B to keep using terminal B and to perform alerting of the subscriber pB.

Figure 11:
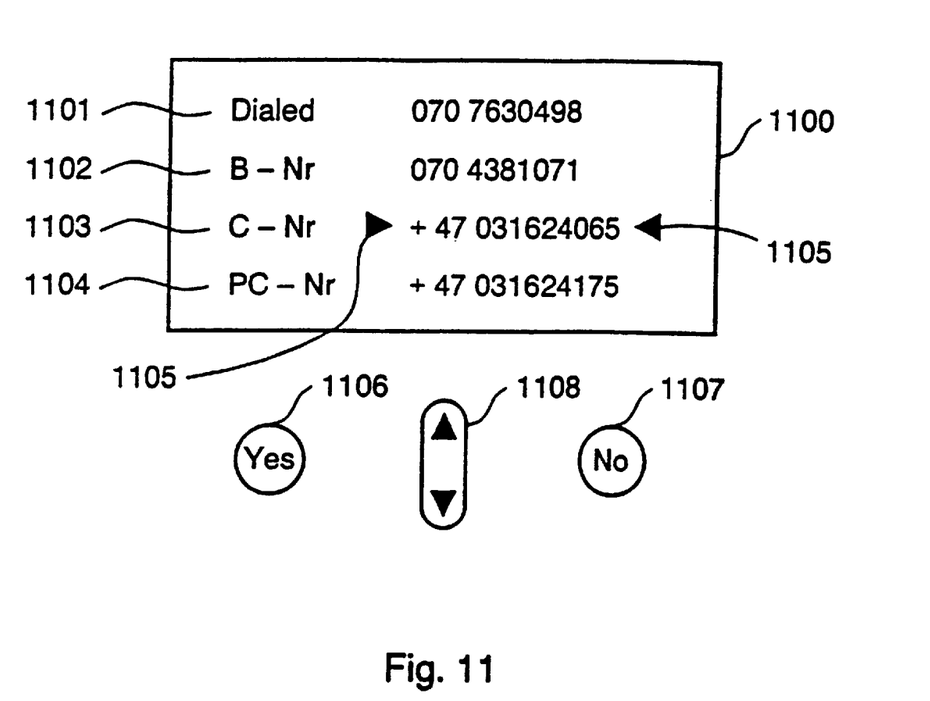
FIG. 11 shows exemplary information displayed on the charger accessory and selection keys according to the invention.

FIG. 11 shows selection keys and exemplary information displayed to a calling subscriber pA on the inventive mobile radio terminal or on the inventive charger accessory of a wire-bound telephone. Consider the case of HLC 807 in FIG. 8, wherein the accessory 807 also may contain an HLRP and battery charging function which however is not of interest in FIG. 8 because the operation of a display associated with the calling terminal A is considered. The display 1100 is a liquid cristal display showing alphanumeric text 1101–1104 and a two-arrow cursor 1105. The cursor control 1108 allows cursor movements or scrolling up and down in the text. The YES key 1106 may start redialing to the terminal C 803, resulting in a traffic call between the POT 801 of terminal A and the POT 803 of terminal C. The NO key 1107 provides return to the previous state, where there may be other choices such as e.g. answering another call that has come in. The telephone numbers in FIG. 11 are hypothetical and do not correspond to any actual numbering plans. The method of scrolling, selecting and activating has been described in detail in application U.S. 08/213704 "uniform man-machine interface for cellular mobile telephones" hereby included by reference in the present application. In the example of FIG. 11 the dialed number 1101 and the B-nr 1102 of the answering terminal B 802 are different which indicates to the A-subscriber that detour routing (not shown in FIG. 8) via a fixed forwarding point in the PSTN 805 has occured. If the dialed alternative is selected for the traffic call by having the cursor point to 1101 and pressing YES 1106 no redialing is requested and instead an alerting order is sent from the HLC 807 to the HLRP 817 whereby the traffic call will be relatively expensive but some seconds setting up time is saved if A is very much in a hurry. If the alternative 1102 is selected, the call will be redialed directly from terminal A to terminal B eliminating the detour routing, if saving cost. If the alternative 1103 is selected, the call is established from terminal A to the wirebound terminal C, thus possibly saving even more cost. The alternative 1104 may regard another POT and PC (not shown in FIG. 8) and may be redialed at the beginning or during the traffic call if desired. In FIG. 11 it has been assumed that the keypad of the HLC consists of the keys 1106, 1107 and 1108. However many variations are possible whereby e.g. the 12-keys of the associated POT or of the battery accessory are used according to a predefined procedure for dialing and selection purposes as assumed above when describing FIGS. 6 and 10.

A further embodiment of the inventive terminal will now be described without using a separate figure. The private home location register HLRP may be located in a mobile data terminal MDT. The MDT may be conceived as a mobile radio terminal capable of sending and receiving data and voice messages coded as pulse code modulation (PCM) data blocks but where the MDT is not capable of being used for a bi-directional real time conversation. All transmission is data transmission, whether actual data such as fax, or PCM-coded short speech messages first entered (talked into) the terminal and PCM-coded, then sent by a predetermined procedure to the called subscriber or a service node where it is stored and may be retrieved as data or speech by the called subscriber. The MDT terminal may be used as the HLRP of its owner to inform on terminals temporarily available to the owner of the MDT. When no such terminals are available this may be expressed in the answer to a caller suggesting voice message communication via a service node with a voice mailbox. The MDT may be a satellite terminal whereby the limitation to short messages is an advantage motivated by the high cost of the associated satellite air-interface time.

A further embodiment of the inventive terminal provides voice information about possible terminal C numbers as in the prior art, but combined with the inventive inband-signaling of terminal C numbers in order to allow redialing to be performed in a signaling supported way when possible and redialing according to the slow prior art method otherwise.

A further embodiment of the inventive terminal provides signaling supported redialing during an already established call provided a terminal C number has been transmitted by the called subscriber to the calling subscriber and stored in the latter's terminal.

From the described embodiments it can be seen that the terminal A functions may be located in the physical terminal A itself, but may alternatively be provided as a physically distinct accessory to a POT or as a service node SN function under control of the subscriber pA whereby the SN may be located in the network near the subscriber pA but always under control of the terminal A used by the calling subscriber. Therefore, the term "terminal A" in the claims is intended to comprise these physical varieties of the inventive signaling supported redialing function.

The foregoing description of the specific embodiments will so fully reveal the general nature of the invention that others can, by applying current knowledge, readily modify and/or adapt for various applications such specific embodiments without departing from the generic concept, and, therefore, such adaptions and modifications should and are intended to be comprehended within the meaning and range of equivalents of the disclosed embodiments. It is to be understood that the phraseology of terminology employed herein is for the purpose of description and not of limitation.

What is claimed is:

1. In a communication system a method for setting up at least one traffic connection between a subscriber pA calling from a terminal A and a subscriber pB called on a terminal B whereby said subscriber pB may have further terminals in the same or other networks, comprising the following steps:

storing in said terminal B at least one terminal address C over which the called subscriber pB may be reached;

calling said terminal B from said terminal A whereby terminal B goes off-hook unconditionally establishing a first connection between terminals A and B;

signaling from said terminal B to said terminal A over said first connection information including at least one terminal address C;

storing in said terminal A said information and analysing whether it is indicated to disconnect said first connection and redial;

if indicated, going on-hook and off-hook in said terminal A and setting up at least one second connection between the subscribers pA and pB using as a destination said at least one terminal address C stored in said terminal A;

if not indicated, using said first connection as a traffic connection.

2. The method of claim 1, wherein the step of signaling comprises in-band signaling over a public telephone network.

3. The method of claim 1, wherein the terminal B is a mobile radio terminal.

4. The method of claim 1, wherein the step of storing in terminal B is performed manually via the keypad of the terminal B using a predetermined procedure.

5. The method of claim 3, wherein the step of storing in terminal B is performed automatically when the terminal B is inserted in a battery charging accessory connected together with a wire-bound terminal C to a telephone line and wherein the method further comprises:

entering according to a predetermined procedure into said battery charging accessory at installation the identity of said telephone line.

6. The method of claim 1, wherein the terminal address C is the address of the terminal B itself.

7. The method of claim 1, wherein the terminal address C is an address of a terminal different from the terminal B.

8. The method of claim 3, wherein the terminal B is a terminal capable of data messaging only.

9. The method of claims 1, wherein the step of setting up at least one second connection is performed when initially setting up a call between the subscribers pA and pB.

10. The method of claims 1, wherein the step of setting up at least one second connection is performed during an ongoing call between the subscribers pA and pB.

11. The method of claims 1, wherein the step of signaling is performed over a first connection between the subscribers pA and pB via a service node and wherein the step of setting up creates a second connection bypassing said service node and disconnects said first connection.

12. In a communication system a terminal A used by a subscriber pA to call a subscriber pB on a terminal B whereby said subscribers may have further terminals in the same or other networks, said terminal A comprising:

means for using in-band signaling over at least one public network for receiving from said terminal B and storing in said terminal A at least one terminal C address over which the called subscriber pB may be reached;

means for storing in said terminal A said information and analyzing whether it is indicated to disconnect said first connection and redial:

means for going on-hook and off-hook in said terminal A and for setting up at least one second connection between the subscribers pA and pB using as a destination said at least one terminal C address stored in said terminal A if it was indicated to disconnect said first connection to redial; and means for using said first connection as a traffic connection if not so indicated.

13. The terminal of claim 12, wherein said terminal B is a mobile radio terminal.

14. The terminal of claim 12 further comprising:

means for using in-band signaling over at least one public network connection for telling the terminal B that the terminal A requests the sending of alternative terminal C addresses.

15. The terminal A of claim 12, further comprising:

means for automatically deciding whether to use the original terminal B address or any of the received terminal C addresses for setting up at least one connection to the subscriber pB wherein said deciding is based on predefined criteria.

16. The terminal of claim 12 further comprising:

means for deciding whether to use the original terminal B address or any of the received terminal C addresses for setting up at least one connection to the subscriber pB wherein said deciding is carried out by the subscriber pA; and means for supplementing said addresses with prefix, country code and other modifications when required for correctly routing said connection.

17. The terminal of claim 12 wherein said means are physically integrated in the terminal.

18. The terminal of claim 12 wherein said means are provided separately housed.

19. A telecommunication system comprising at least one network and a plurality of terminals whereby communication between a calling subscriber pA and a called subscriber pB includes the possibility of signaling a terminal C address from a called terminal B during a first preparatory call and whereby this preparatory call may be followed by a second traffic call to said terminal C address, the system comprising:

mobile radio terminals including:
- means for storing and later sending at least one terminal C address when receiving said preparatory call; and
- means for requesting and receiving at least one such a terminal C address and using it to originate said traffic call;

transmission means including:
- means for transmission of user traffic;
- means for in-band transmission of said at least one terminal C address over at least a part of the at least one network; and a battery charging accessory connected to said terminal C including means for transmitting said at least one terminal C address to said mobile radio terminals when said mobile radio terminals are inserted into said battery charging accessory.

20. The system of claim 19 further capable of setting up calls via service nodes, the system further comprising:

service nodes including:
- means for connecting at least two lines to the transmission means of the at least one network; and
- means to receive an order to set up calls from the service node to subscribers pA and pB to execute said order and to interconnect said subscribers pA and pB.

* * * * *

UNITED STATES PATENT AND TRADEMARK OFFICE
CERTIFICATE OF CORRECTION

PATENT NO. : 5,953,657
DATED : September 14, 1999
INVENTOR(S) : Walter Ghisler

It is certified that error appears in the above-identified patent and that said Letters Patent is hereby corrected as shown below:

On the title page:

[75] Inventor: please delete "Switzerland" and insert therefore --Sweden--.

[30] Foreign Application Priority Data please delete "May 27, 1994 (CH)   Switzerland   9401834" and insert therefore --May 27, 1994 [SE]   Sweden   9401834--.

Signed and Sealed this

Seventeenth Day of October, 2000

Attest:

Q. TODD DICKINSON

*Attesting Officer*  *Director of Patents and Trademarks*